United States Patent [19]

Mori et al.

[11] 4,127,846

[45] Nov. 28, 1978

[54] TONE SIGNAL DETECTING CIRCUIT

[75] Inventors: Toshihiro Mori; Takashi Oda; Koichi Nagata, all of Tokyo, Japan

[73] Assignee: Nippon Electric Co., Ltd., Tokyo, Japan

[21] Appl. No.: 854,967

[22] Filed: Nov. 25, 1977

[30] Foreign Application Priority Data

Nov. 26, 1976 [JP] Japan .................................. 51-141859
Nov. 26, 1976 [JP] Japan .................................. 51-141861

[51] Int. Cl.² .............................................. H04Q 1/45
[52] U.S. Cl. .......................... 340/171 PF; 340/171 R; 340/311
[58] Field of Search ............. 340/171 PF, 171 R, 311, 340/312; 325/55, 64

[56] References Cited

U.S. PATENT DOCUMENTS 3,670,242 6/1972 McGarvey ............................ 325/55
3,882,466 5/1975 Poorvin ......................... 340/171 PF

*Primary Examiner*—Harold I. Pitts
*Attorney, Agent, or Firm*—Sughrue, Rothwell, Mion, Zinn and Macpeak

[57] ABSTRACT

A tone signal detecting circuit for use in a paging receiver or the like employs an N-path filter in place of an active filter to facilitate circuit integration. The circuit includes a clock signal generating circuit responsive to a first control signal for selecting and reading out one of plural clock signals of a frequency equal to N (N being an integer equal to or greater than 2) times the frequency of the plural tone signals. The N-path filter has a prescribed rise and fall time and selects and responds to a tone signal in accordance with a clock signal from the clock signal generating circuit. A low-pass filter having prescribed frequency characteristics removes harmonic signals of the tone signals contained in the output of tne N-path filter. A tone designating circuit responsive to a second control signal is connected to the low-pass filter and changes its frequency characteristics. A detector is connected to the output of the low-pass filter, and control circuits are responsive to the output of the detector to generate the first and second control signals.

6 Claims, 6 Drawing Figures

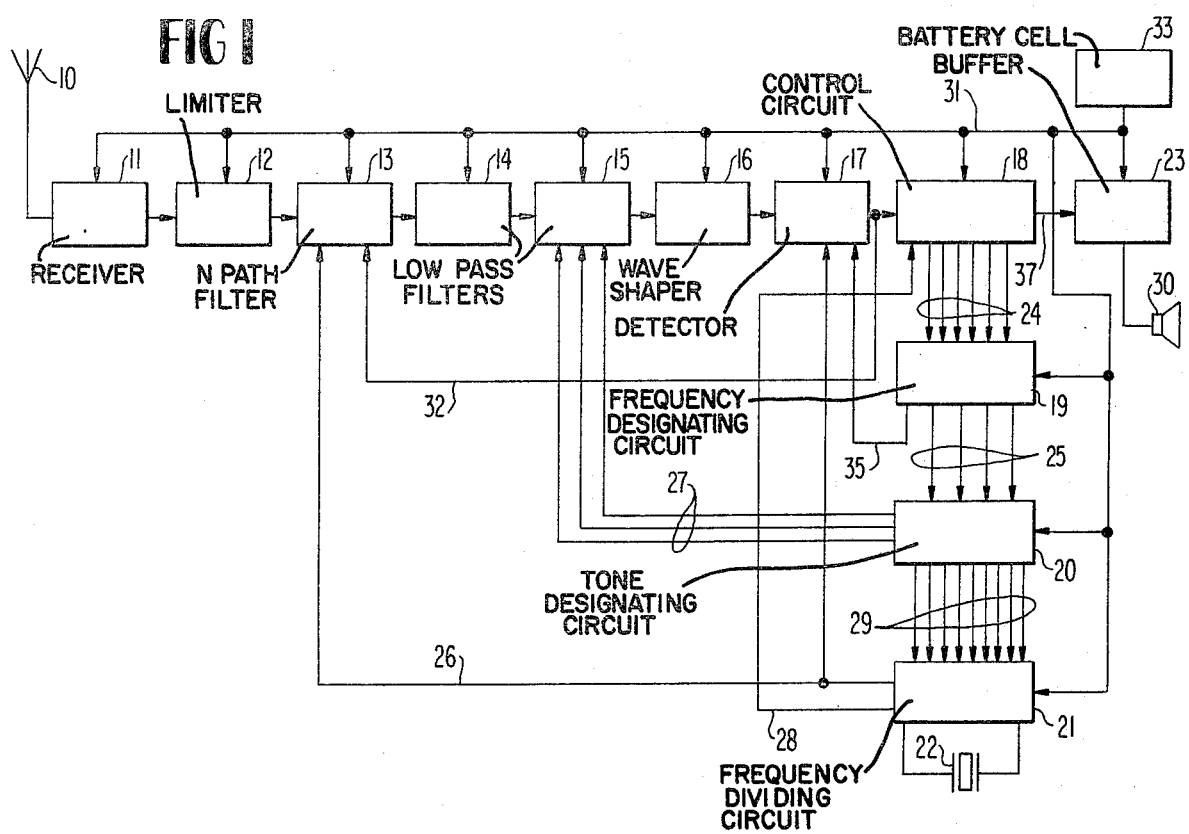
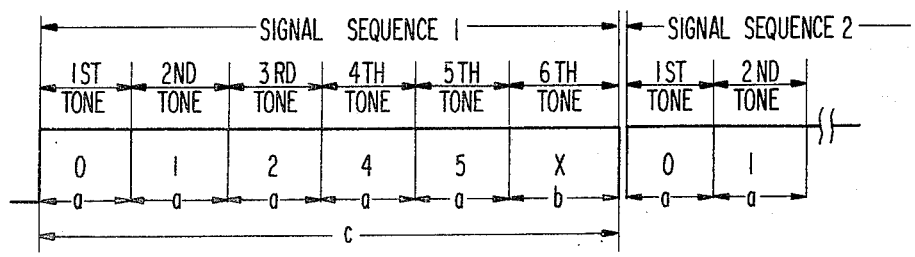
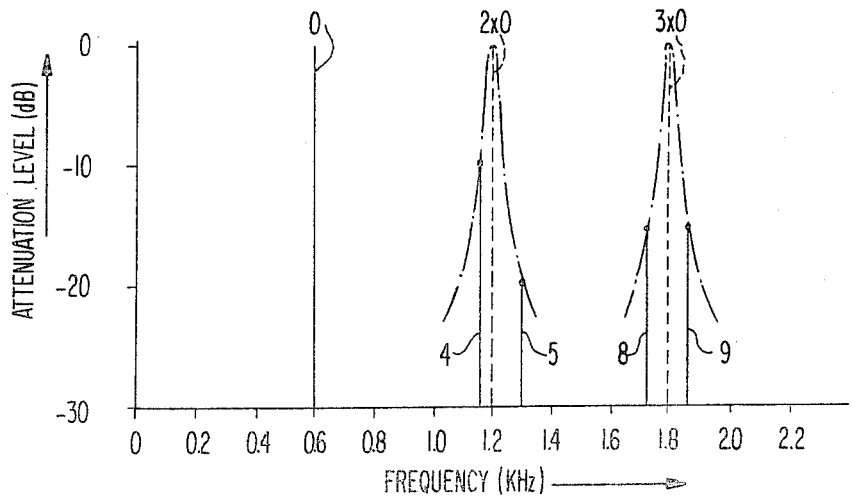

TONE SIGNAL DETECTING CIRCUIT

BACKGROUND OF THE INVENTION

This invention relates to radio tone signal detecting circuits in such devices as paging receivers, and more particularly it pertains to tuneable tone signal detectors having N-path filters.

A conventional tone signal detecting circuit or a selective receiver (reference is made to U.S. Pat. Nos. 3,670,242 and 3,882,466) typically consists of an active filter for sequentially passing more than one paging tone signal frequency, a detector for detecting the output of this filter, means responsive to the output of this detector for changing the center frequency and band width of the active filter, and indicator means responsive only to the final one of the paging tone signals for indicating the receiver is being paged.

However, since the center frequency, band width, voltage gain and other properties of the active filter (reference is made to, for instance, U.S. Pat. No. 3,803,429) are dependent on the resistance and capacitance of the resistor and capacitor, respectively, which constitute the filter, these values of the resistor and capacitor require high degrees of accuracy, which prove a major impediment to circuit integration and, consequently, to cost reduction.

SUMMARY OF THE INVENTION

An object of this invention is to provide a tone signal detecting circuit which uses an N-path filter in place of an active filter, thereby avoiding the above-stated disadvantage of the conventional circuit.

In accordance with the present invention, there is provided a tuneable tone signal circuit for sequentially receiving and passing more than one tone signal, which includes a first means in response to a first control signal for selecting and sending out one of plural clock signals of a frequency equal to N (N being an integer equal to or greater than 2) times the frequency of the plural tone signals, an N-path filter having a prescribed rise and fall time for selecting and responding to a tone signal in accordance with the output of the first means, a first filter having prescribed frequency characteristics for removing harmonic signals of the tone signals contained in the output of said N-path filter, a second means connected to the first filter for changing its frequency characteristics in response to a second control signal, a detector connected to the first filter for operating in response to each of the tone signals sequentially passed by the N-path filter to generate detecting signals, and a third means connected to this detector and operating in response to the detecting signals to generate the first and second control signals.

BRIEF DESCRIPTION OF THE DRAWINGS

The invention will be described in detail below with reference to the accompanying drawings wherein:

FIG. 1 is a block diagram of a selective signalling receiver in which is used a tone signal detecting circuit constructed in accordance with the present invention;

FIG. 2 shows a sequence of tone signals used in a tone signal detecting circuit constructed in accordance with the present invention;

FIG. 3 shows examples of signal attenuation characteristics in an N-path filter;

DETAILED DESCRIPTION OF THE INVENTION

Figure 4:
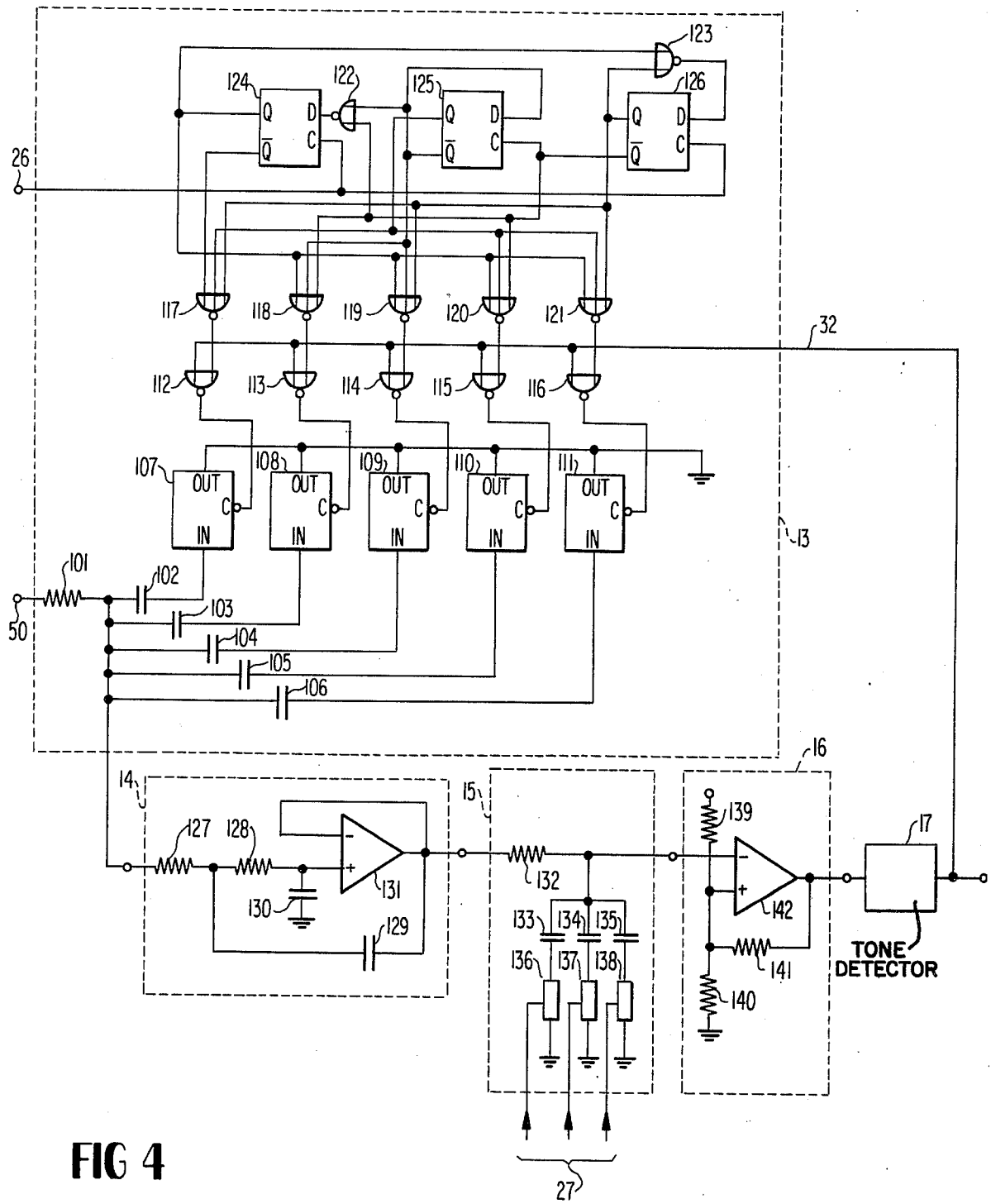
FIG. 4 shows a more specific example of the circuits of the N-path filter and low-pass filter in FIG. 1.

In FIG. 1, carrier waves modulated with prescribed tone signals are received at the antenna 10 and fed to the receiver 11. The receiver 11 is a double superheterodyne unit including a discriminator. Signals demodulated in the receiver 11 make the discriminator saturate, and the output of the discriminator is fed to the N-path (N being equal to, for instance, 5) filter 13 through the limiter 12 for removing any amplitude modulation component due to noise and the effect of drifts of the discriminator. The N-path filter 13 passes frequencies equal to 1/N and A/N (where A is an integer) of the clock frequency 26. The low-pass filter 14 is inserted to convert the step-form waves of the output of the N-path filter 13 into a form close to sine waves.

The tone signal frequencies to be used can correspond to call numbers as indicated in the following table:

Table

| Call Number | Frequency (Hz) |
|---|---|
| R | 459 |
| 0 | 600 |
| 1 | 741 |
| 2 | 882 |
| 3 | 1,023 |
| 4 | 1,164 |
| 5 | 1,305 |
| 6 | 1,446 |
| 7 | 1,587 |
| 8 | 1,728 |
| 9 | 1,869 |
| X | 2,010 |

In this table, character R is the repeat tone signal, which is used in such a manner that, if the call number is 11256X for example, a tone signal sequence of 1R256X is sent. Character X is the tone signal for dual call discrimination. If, for instance, a subscriber is assigned a call number of 11256X, he will in effect have two call numbers distinguished from each other by whether or not he receives the sixth tone signal, X.

Where frequencies are assigned as shown in the table above, the cut-off frequency of the first low-pass filter 14 is so determined as to pass 2,010 Hz and cut off at 2,295 Hz, which is N times the clock frequency of 459 Hz (459 × 5 = 2,295). The output of this first low-pass filter 14 has an A/N component of a frequency other than 1/N of the clock frequency 26, attributable to the tone signal. Therefore, to attenuate the level of harmonics other than the desired frequency, the output of the first low-pass filter 14 is further fed to a second low-pass filter 15. This second low-pass filter 15 is so designed as to change the pass-band frequency for each tone signal in accordance with the control signal 27 from the tone designating circuit 20 to be referred to below. Now suppose, as shown in FIG. 2 for instance, a predesignated tone signal sequence is composed of the five or six tones and the call number is 01245 or 01245X. Also suppose characters $a$, $b$ and $c$ here respectively equal 33 ms, 45 ms and 210 ms. For such signal sequence, the N-path filter 13 and the detector 17 are standing by to be actuated by a clock 26 of 3,000 Hz (= 600 × N = 600 × 5) corresponding to the frequency (600 Hz) of the first tone signal ("0" in call number). The second low-pass filter 15 is also set by the control signal 27 at a pass-band width corresponding to the frequency (600 Hz) of the first tone signal. Accordingly, the tone signal frequency (600 Hz) fed to the N-path filter 13 and another frequency equal to A times 600 Hz pass the N-path filter 13 and further the first low-pass filter 14 to be converted into a form close to sine waves. Since the N-path filter 13 passes the tone signal frequency of 600 Hz and the other frequency of 600 × A Hz, undesired tone signals close to 600 × A Hz also pass the filters, as illustrated in FIG. 3, at attenuated levels.

To consider the illustrated tone frequency of 600 Hz ("0" in call number), the N-path filter 13 passes a tone frequency of 600 Hz × A. Therefore, applicable tone frequencies in the vicinity of 1,200 (= 600 × 2) Hz, such as 1,164 Hz ("4" in call number) and 1,305 Hz ("5" in call number) pass the N-path filter 13, resulting in a higher noise level which is likely to induce malfunctioning. The same can be said of tone frequencies in the vicinity of 1,800 (= 600 × 3) Hz, such as 1,728 Hz ("8" in call number) and 1,869 Hz ("9" in call number).

Thus, depending on how tone signal frequencies are assigned, the disadvantage of an N-path filter manifests itself as described above.

To fundamentally eliminate this disadvantage, it is necessary to provide a second low-pass filter 15 and set its cut-off frequency $F_{cut}$ within the range of 600 Hz to 1,200 Hz. In this example, the cut-off frequency of the second low-pass filter 15 is regulated by the control signal 27 with regard to the three sets of tone frequencies corresponding to call numbers "R", "0, 1" and "2, 3". The cut-off frequency of the second low-pass filter 15 is so set that the filter passes a tone signal frequency of 600 Hz and eliminates undesired tone signals. The first and second low-pass filters 14 and 15 may be integrated into one low-pass filter.

A wave shaping circuit 16 (for example, a window comparator having the function of level detection) converts the tone signal derived from the low-pass filter 15 into a rectangular wave which is fed to a detector 17. The detector 17 counts the number of the clock pulses within a predetermined period to detect desired tone signals. The output of the detector 17 is fed to a control circuit 18 and the N-path filter 13. The detected signal 32 fed to the N-path filter 13 is used to increase the bandwidth of the N-path filter 13, resulting in the increase in the energy decay rate thereof. However, where transmitting time of each tone signal (a, b shown in FIG. 2) is longer or the tone signal levels are high, the signal 32 may be omitted. The control circuit 18 controls a frequency designating circuit 19 in accordance with the output of the detector 17. The frequency designating circuit 19 consists, for instance, of a PROM (programmable read-only memory) of transistor-matrix type. Programming is achieved by making alternately conductive and non-conductive the diode connected to this transistor base electrode, and the line from the transistor base electrode is connected to the tone frequency designating line 24 of the control circuit 18.

When this line 24 is set at a high electric potential, the contents of the transistors of the row are read out in parallel, and the signals are given in binary codes. The tone designating circuit 20 includes means for converting the binary output 25 of the frequency designating circuit 19 into the control signal 27 which determines the cut-off frequency of the second low-pass filter 15, and means for processing individual tone signal designating signals to supply the output signals 29 to a variable frequency dividing circuit 21. Its detailed description will be made with reference to FIG. 6. This variable frequency dividing circuit 21, in response to the output signal 29 of the tone designating circuit 20, generates a signal 26 which sets the following tone signal frequency. The control circuit 18, whose details will be described with reference to FIG. 5, has the function of setting the tone signal frequency of the N-path filter 13 to the first tone of a predetermined tone signal sequence when the time interval between the adjacent outputs of the detector 17 exceeds a prescribed length (45 ms for example). Further, the control circuit 18 has the function of generating pulses of a desired period by dividing the frequency of the timing output signal 28 of the variable frequency dividing circuit 21 and the function of supplying the buffer circuit 23 with a singing signal 34 when the whole predetermined tone signal sequence has been received. A detecting pulse fed from the detector 17 to this control circuit 18 advances the content of the counter contained in the circuit 18 by one, so that the signal 24 is changed to read out a code corresponding to the prescribed tone signal frequency which is to be received next. Then, the contents of the frequency designating circuit 19 are read out, and the binary code 25 controls the tone designating circuit 20. The output signal 29 of the circuit 20 sets the number into which the variable frequency dividing circuit 21 divides the frequency of the crystal resonator 22 to obtain the desired clock frequency 26. The frequency of the crystal resonator 22 is divided at a fixed ratio to create the timing output signal 28. The second low-pass filter 15 passes the second tone signal frequency of 741 Hz ("1" in the call number) to be received next, the cut-off frequency of which is set with the control signal 27 as to attenuate the component of A times said frequency. The variable frequency dividing circuit 21 generates a clock corresponding to the desired tone frequency (741 Hz), and the clock is fed to the N-path filter 13 and the detector 17. When the whole predetermined signal sequence has been detected, the output signal 34 of the control circuit 18 actuates the speaker 30 through the buffer circuit 23 (comprising, for instance, a transistor and a resistor) having an amplifying function. The output of a battery cell 33 is fed through a line 31 to the circuits 11-21 and 23.

FIG. 4 shows the circuits 13, 14, 15 and 16 of FIG. 1 in greater detail. The N-path filter 13 shown in FIG. 4 is composed of the resistor 101, capacitors 102-106, switches 107-111, NOR gates 112-123 and flip-flops 124-126. The NOR gates 122 and 123 and flip-flops 124-126 constitute a quinary counter. When one of the NOR gates 117-121 controlling the output of the quinary counter with the clock frequency 26 rises to a high level, it closes one of the switches 107-111 through one of the NOR gates 112-116, and only the capacitor (one of 102-106) connected to the closed switch will, together with the resistor 101, form a low-pass filter. Thus, with the advance of the quinary counter, each capacitor forms a low-pass filter with the resistor 101. The N-path filter 13 selectively allows the output signal 50 of the limiter 12 to pass. FIG. 4 illustrates an example of N-path filter where N equals 5. A band-pass filter of such composition is disclosed in Frank et al., "An Alternative Approach to the Realization of Network Transfer Function: The N-Path Filter", B.S.T.J., September 1960, pp. 1,321–1,350, and William R. Harden, "Digital filters with IC's boost Q without inductors", *Electronics*, July 24, 1967, pp. 91-100. The center frequency $f_o$ of this band-pass filter is given by the clock $f_{cp}$ 26, but is not dependent on any component (in particular the resistor 101 or the capacitors 102-106) of the filter. Namely, $f_o = f_{cp}/N$. Therefore, once the value of N is given, the center frequency $f_o$ can be freely varied by altering the value of $f_{cp}$. Since the N-path filter has a prescribed energy buildup and decay rate, it is normally unable to allow any particularly rapid continuous sequence of tone signals to pass when plural sequences of tone signals of different frequencies are to pass it. To solve this problem, the signal 32 is given to the gates 112-116 so that the switches 107-111 are forcibly closed along with tone detection to rapidly increase the energy decay rate by changing the band width and thereby facilitate detection of tone signal sequence.

The first low-pass filter 14 (consisting of the resistors 127 and 128, capacitors 129 and 130 and operational amplifier 131) forms an active filter. The second low-pass filter 15 is composed of the resistor 132, capacitors 133-135 and switches 136-138. Out of the control lines 27, the line corresponding to the awaited tone rises to a high level. One of the switches 136-138 which is connected to this high level line is closed so that the capacitor connected to this switch is coupled with the resistor 15 to form a low-pass filter and give the desired filter characteristics.

The wave shaping circuit 16, with its resistors 139-141 and operational amplifier 142, constitutes a window comparator. A conventional voltage comparator can be used as well as the circuit 16.

The tone detector 17 can be a tone signal detector of the type disclosed in patent application Ser. No. 854,868, filed Nov. 25, 1977, and assigned to the assignee of this application, or a tone detecting circuit (32) disclosed in U.S. Pat. No. 3,670,242 to McGarvey, mentioned hereinabove.

Figure 5:
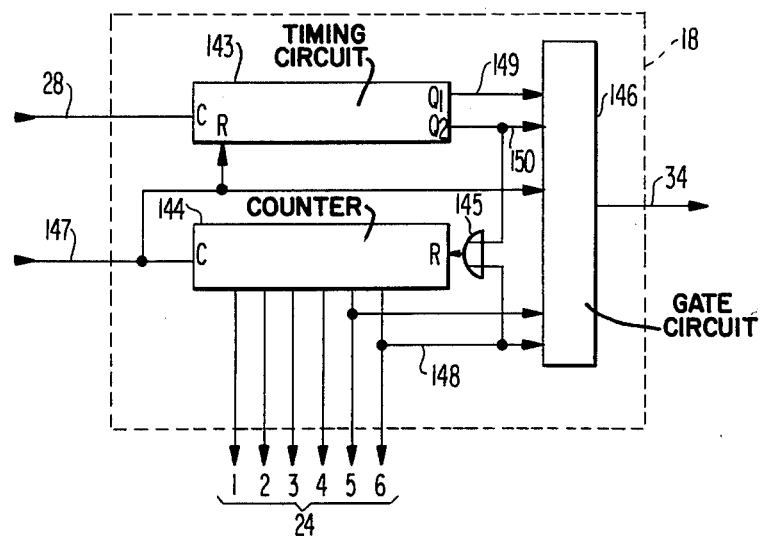
FIG. 5 is a more specific block diagram of the control circuit shown in FIG. 1.

The control circuit 18 shown in FIG. 5 is composed of the timing circuit 143, counter 144 and gate circuit 146. The signal 28 from the variable frequency dividing circuit 21 is supplied to the timing circuit 143. When the output 147 of the tone detector 17 is fed to the control circuit 18, it advances the content of the counter 144 by one, effects a switch-over from the first signal of the preset signal sequence to the second, and at the same time resets the timing circuit 143 for the aforementioned 45-ms timing. As the counter 144 is successively advanced with the output signals 147 and all the predetermined tones have been detected, the gate circuit 146 is informed of the completion of detection. A singing period, for instance, is created in accordance with the signal 149 from the timing circuit 143 which is supplied to the buffer circuit 23 through the signal line 34. However, if no input is given to the counter 144 after a number of pulses have been fed to it or after the lapse of a certain period of time (45 ms for example), the output 150 of the timing circuit 143 will reset the counter 144 through the OR gate 145 to set the waiting tone in the state of the first tone signal.

Figure 6:
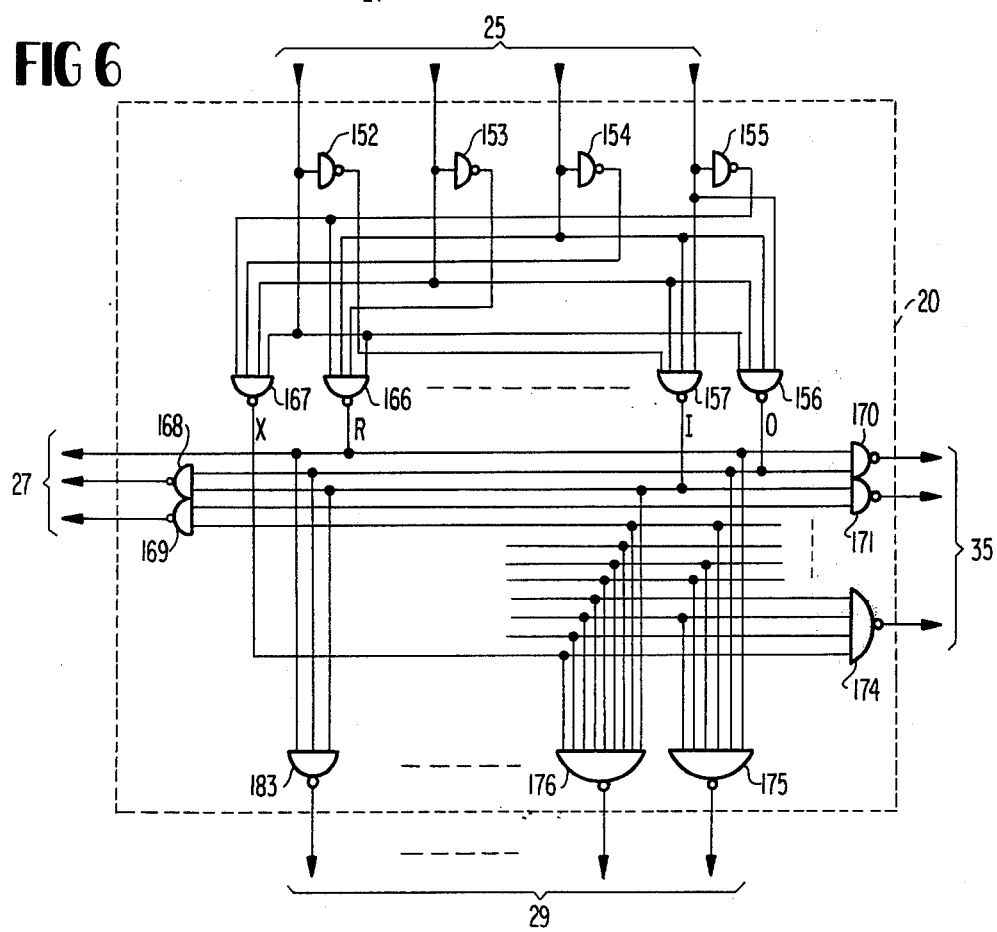
FIG. 6 shows a specific example of the tone designating portion of the tone signal detecting circuit shown in FIG. 1.

In the tone designating circuit 20 illustrated in FIG. 6, the 12 four-input NAND gates 156-167 provide outputs corresponding to the aforementioned call nunbers "R", "0", "1", ... "9", "X" from the output 25 of the frequency designating circuit 19 and the outputs of the inverters 152-155. It is possible to generate the control signals 27 for the low-pass filter 15, as illustrated, for instance, on the basis of these outputs corresponding to individual tones. Thus, the call numbers are divided into four groups, "R", "0, 1", "2, 3" and "4-9, X", and the filter 15 is controlled accordingly. Similarly, the control signals 35 for the detector 17 can be generated by the five NAND gates 170-174. The control signals 29 for the variable frequency dividing circuit 21, too, can be generated by the combination of nine (equal to the number of flip-flop stages constituting the variable frequency dividing circuit) NAND gates 175-183 on the basis of the 12 operating lines, each corresponding to a tone signal.

As is obvious from the above description, the tone signal detecting circuit of the present invention has the following advantages: Because of its use of an N-path filter, the center frequency of the filter is not dependent on the resistance and capacitance of the resistor and capacitor, respectively, which constitute the N-path filter, and accordingly, no high-precision, and consequently, expensive resistors or capacitors need not be used. Furthermore, the combined use of a second low-pass filter makes it possible to eliminate noises other than the desired tone signals.

What is claimed is:

1. A tuneable tone signal detecting circuit for sequentially receiving and passing a plurality of tone signals in a predetermined sequence comprising:
    a first means responsive to a first control signal for selecting and providing as an output one of a plurality of clock signals of a frequency equal to N, N being an integer equal to or greater than 2, times the frequency of said plurality of tone signals;
    an N-path filter having a prescribed energy buildup and decay rate for selecting and responding to said plurality of tone signals in accordance with the output of said first means;
    a first filter having prescribed frequency characteristics for removing harmonic signals of each of said plurality of tone signals contained in the output of said N-path filter;
    a second means connected to said first filter for changing said frequency characteristics in response to a second control signal, a detector connected to said first filter and responsive to each of said plurality of tone signals sequentially passing said N-path filter for providing a detected output; and
    a third means connected to said detector and responsive to said detecting signals for providing said first and second control signals.

2. A tone signal detecting circuit as claimed in claim 1 which further comprises an indicator means connected to said detector and responsive to a detecting signal corresponding to the final one of said plurality of tone signals for indicating the reception of a prescribed series of tone signals.

3. A tone signal detecting circuit as claimed in claim 1 wherein said first means comprises a signal generator and a fifth means responsive to said first control signal for dividing the frequency of the output of said signal generator at varying ratios to generate said clock signals.

4. A tone signal detecting circuit as claimed in claim 1 wherein said N-path filter comprises a resistor for receiving said plurality of said tone signals at one terminal thereof and N first capacitors connected in parallel to the other terminal of said resistor and switches each connected in series to one of said N capacitors for being opened and closed in a cyclic sequence by the frequency of said clock signals, and wherein said fourth means simultaneously closes all of said switches in response to said detected output.

5. A tone signal detecting circuit as claimed in claim 1 wherein said first filter is a low-pass filter comprising at least of a resistor and a plurality of second capacitors.

6. A tone signal detecting circuit as claimed in claim 5 which further comprises means for connecting said second means to said second capacitors.

* * * * *

UNITED STATES PATENT AND TRADEMARK OFFICE
CERTIFICATE OF CORRECTION

PATENT NO. : 4,127,846
DATED : November 28, 1978
INVENTOR(S) : Toshihiro MORI, Takashi ODA, Koichi NAGATA It is certified that error appears in the above-identified patent and that said Letters Patent are hereby corrected as shown below:

Column 6, line 28 - delete "N, N" insert -- N (N --

Column 6, line 29- delete "2," insert -- 2) --

Add Claim 7:

7. A tone signal detecting circuit as claimed in in Claim 1 which further comprises a fourth means responsive to said detecting signal for increasing said energy decay rate.

Claim 4, change "claim 1" to -- claim 7 --

On the title page, after the "Abstract" "6 Claims" should read -- 7 Claims --.

*Signed and Sealed this*

*Fourth* Day of *December 1979*

[SEAL]

*Attest:*

SIDNEY A. DIAMOND

*Attesting Officer*     *Commissioner of Patents and Trademarks*